(12) United States Patent
Siudak

(10) Patent No.: US 12,460,875 B1
(45) Date of Patent: Nov. 4, 2025

(54) HEAT RECOVERY SYSTEM

(71) Applicant: Stanley Siudak, New Port Richey, FL (US)

(72) Inventor: Stanley Siudak, New Port Richey, FL (US)

( * ) Notice: Subject to any disclaimer, the term of this patent is extended or adjusted under 35 U.S.C. 154(b) by 177 days.

(21) Appl. No.: 18/483,590

(22) Filed: Oct. 10, 2023

(51) Int. Cl.
*F28D 7/10* (2006.01)
*F28D 7/16* (2006.01)
*F28D 21/00* (2006.01)

(52) U.S. Cl.
CPC .......... *F28D 21/0008* (2013.01); *F28D 7/16* (2013.01)

(58) Field of Classification Search
CPC .............................. F28D 21/0008; F28D 7/16
USPC ......................................................... 165/157
See application file for complete search history.

(56) References Cited

U.S. PATENT DOCUMENTS

| | | | |
|---|---|---|---|
| D643,379 S | 8/2011 | Bolin | |
| 10,598,403 B2 | 3/2020 | Woods | |
| D919,077 S | 5/2021 | Benz | |
| 2002/0022449 A1 | 2/2002 | Beaini | |
| 2005/0139692 A1 | 6/2005 | Yamamoto | |
| 2012/0233876 A1 | 9/2012 | Weldon | |
| 2013/0125841 A1 | 5/2013 | Teramoto | |
| 2022/0390126 A1 | 12/2022 | Kazimirovich | |

FOREIGN PATENT DOCUMENTS

| | | | | |
|---|---|---|---|---|
| CN | 101900021 A | * | 12/2010 | |
| CN | 103712436 B | * | 7/2016 | |
| JP | 2015148355 A | * | 8/2015 | |
| KR | 101147609 B1 | * | 5/2012 | .............. F28F 9/185 |

* cited by examiner

*Primary Examiner* — Davis D Hwu (57) ABSTRACT

The heat recovery system is a heat transfer device that is configured for use with an HVAC. The heat recovery system captures waste heat that is generated by an exothermic chemical reaction (such as combustion). The heat recovery system transports the captured waste heat to an HVAC. The captured waste heat is used to increase the temperature of air that is drawn into the heat recovery system from the environment. The heated air is discharged into the HVAC. The heat recovery system incorporates a radiator structure, an exterior shell, and a fan structure. The radiator structure is contained in the exterior shell. The fan structure mounts on the exterior shell. The heat recovery system: a) draws air in from the environment; b) heats the drawn air over the radiator structure; and, c) discharges the heated drawn air into the HVAC.

10 Claims, 7 Drawing Sheets

HEAT RECOVERY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of energy recovery systems. (F24F12/003)

SUMMARY OF INVENTION

The heat recovery system is a heat transfer device. The heat recovery system is configured for use with an HVAC. The heat recovery system captures waste heat that is generated by an exothermic chemical reaction (such as combustion). The heat recovery system transports the captured waste heat to an HVAC. The captured waste heat is used to increase the temperature of air that is drawn into the heat recovery system from the environment. The heated air is discharged into the HVAC. The heat recovery system comprises a radiator structure, an exterior shell, and a fan structure. The radiator structure is contained in the exterior shell. The fan structure mounts on the exterior shell. The heat recovery system: a) draws air in from the environment; b) heats the drawn air over the radiator structure; and, c) discharges the heated drawn air into the HVAC.

These together with additional objects, features and advantages of the heat recovery system will be readily apparent to those of ordinary skill in the art upon reading the following detailed description of the presently preferred, but nonetheless illustrative, embodiments when taken in conjunction with the accompanying drawings.

In this respect, before explaining the current embodiments of the heat recovery system in detail, it is to be understood that the heat recovery system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the heat recovery system.

It is therefore important that the claims be regarded as including such equivalent construction insofar as they do not depart from the spirit and scope of the heat recovery system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
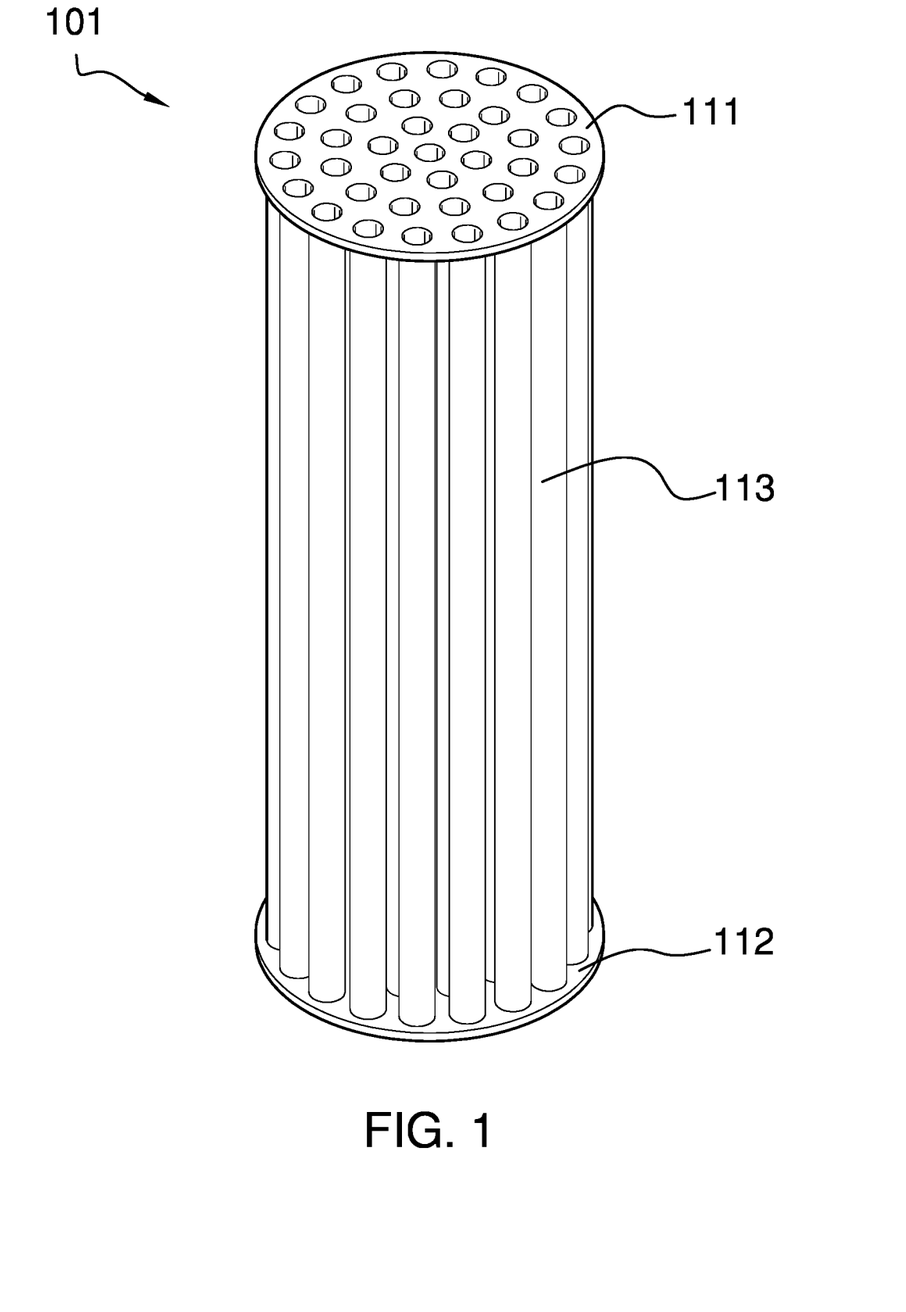
FIG. 1 is a perspective view of an embodiment of the disclosure.
Figure 2:
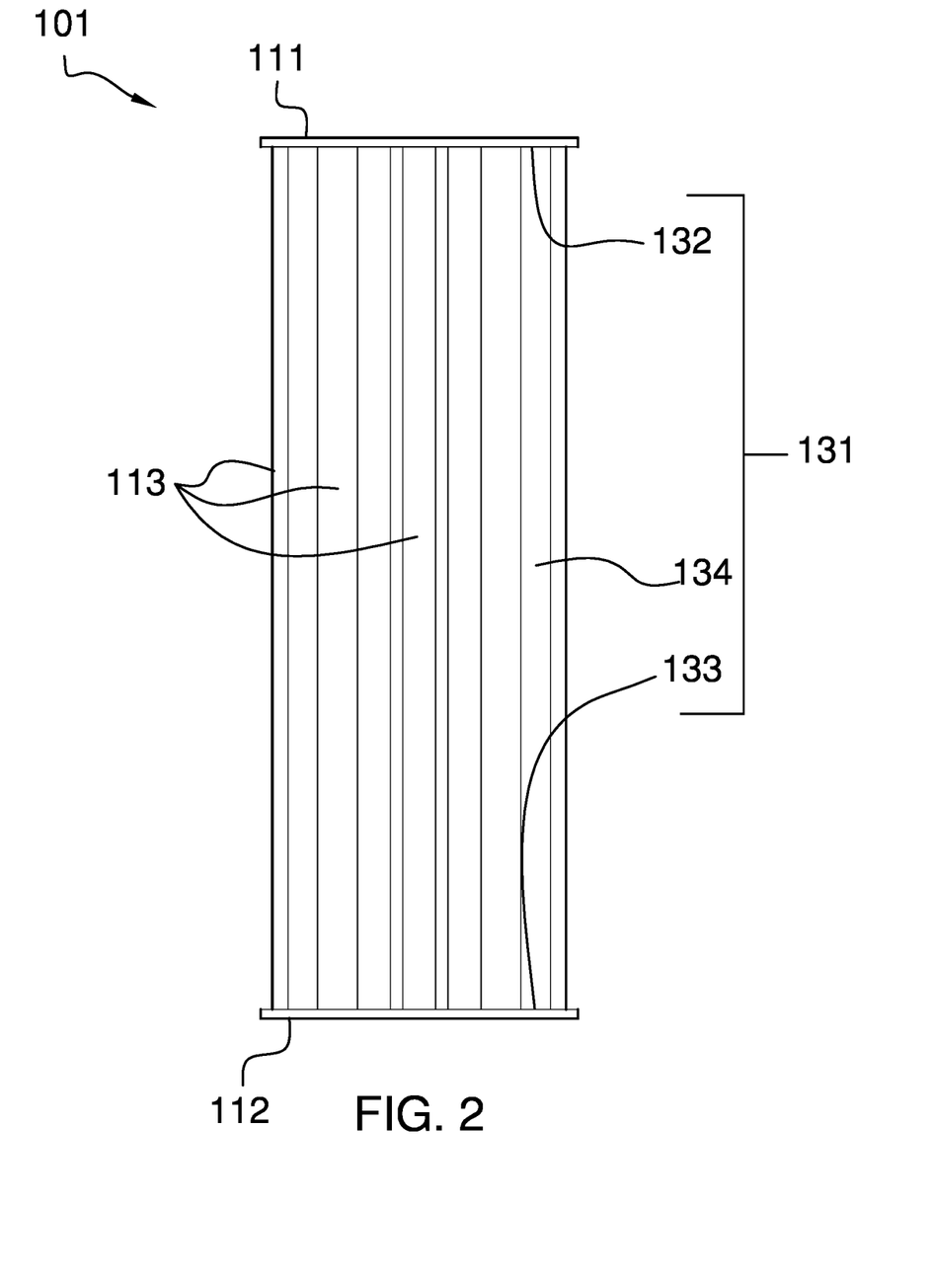
FIG. 2 is a side view of an embodiment of the disclosure.
Figure 3:
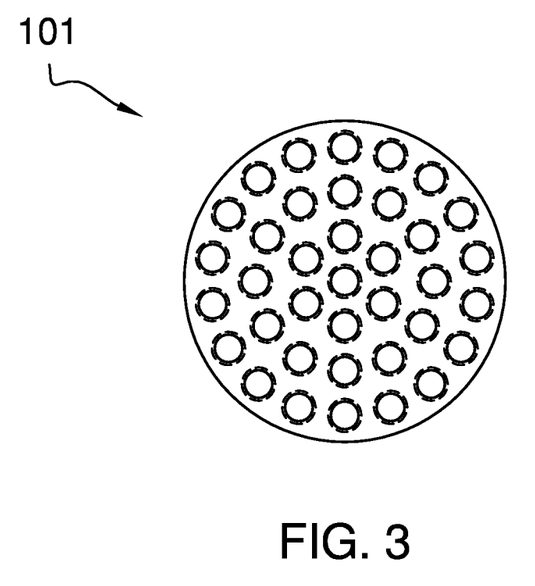
FIG. 3 is a bottom view of an embodiment of the disclosure.
Figure 4:
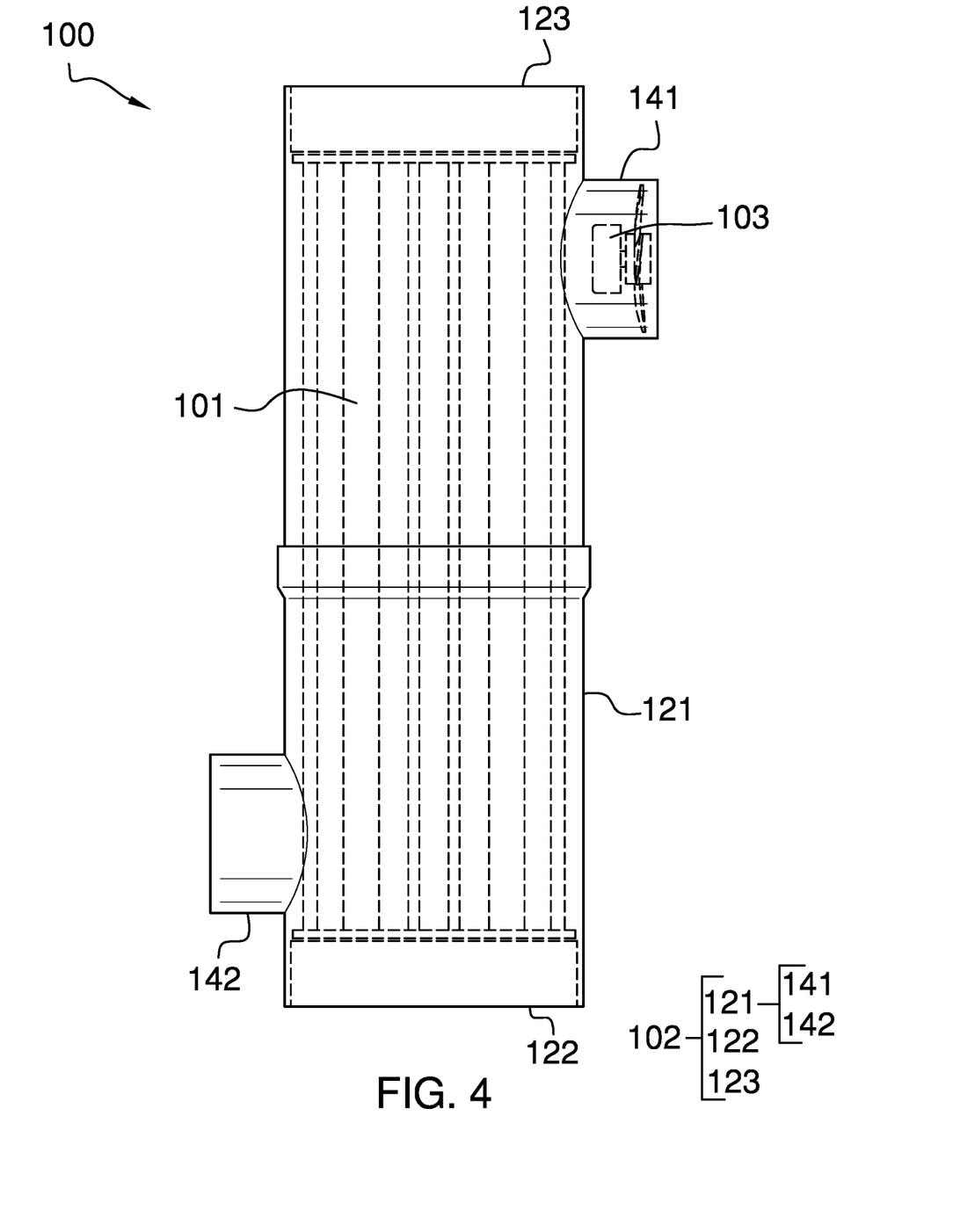
FIG. 4 is a detail view of an embodiment of the disclosure.
Figure 5:
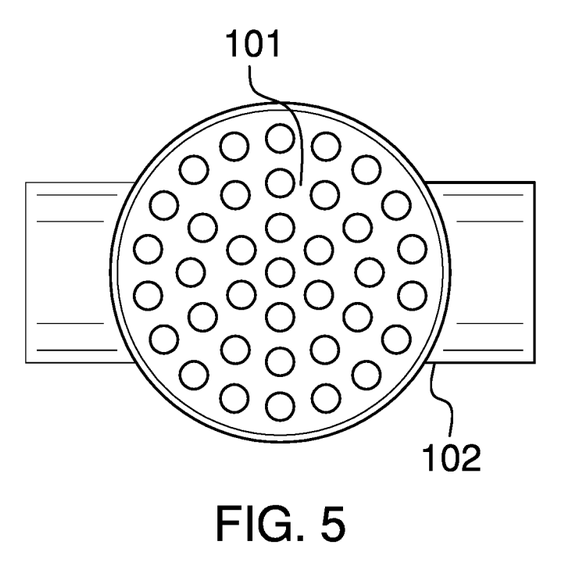
FIG. 5 is a top view of an embodiment of the disclosure.
Figure 6:
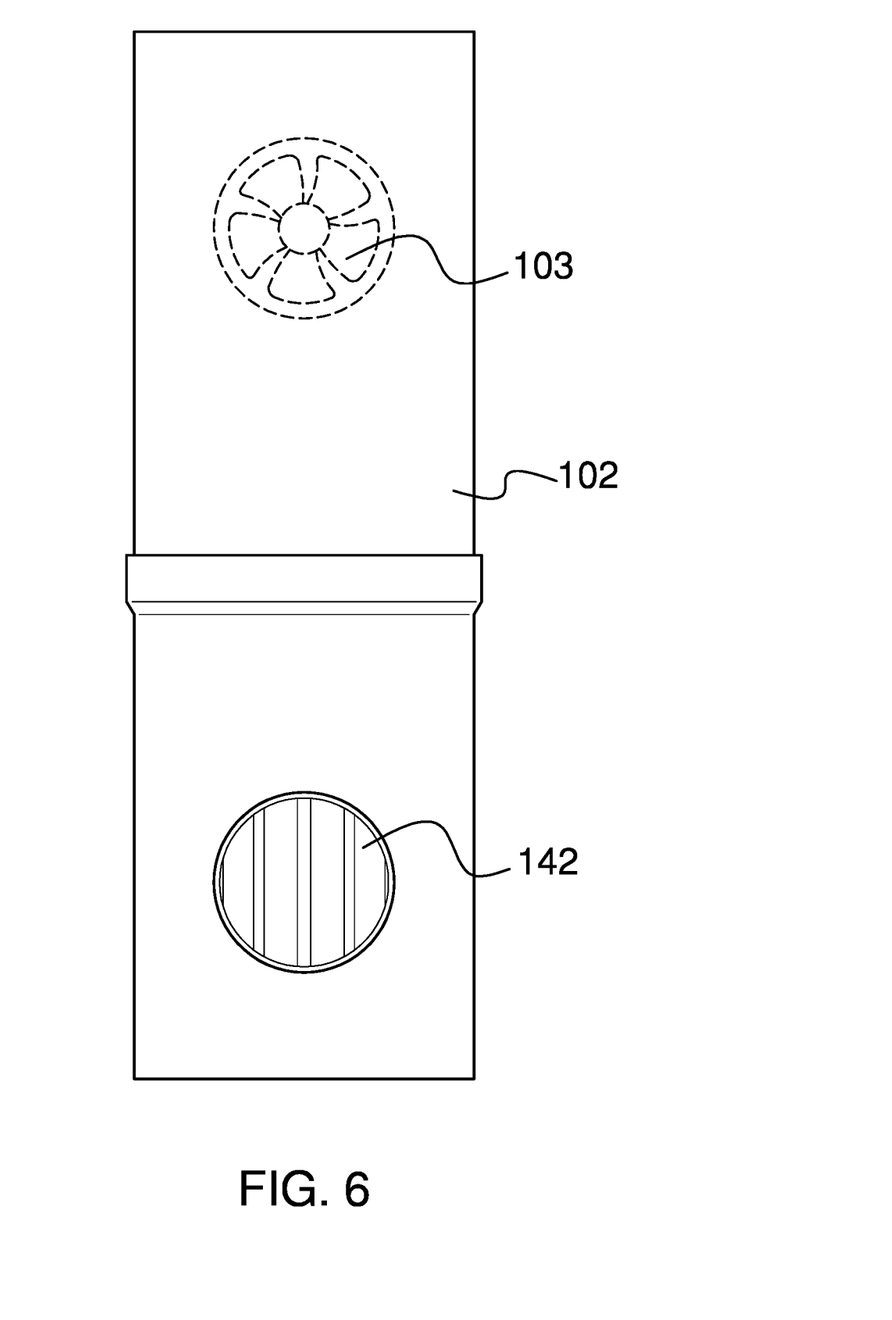
FIG. 6 is a front view of an embodiment of the disclosure.
Figure 7:
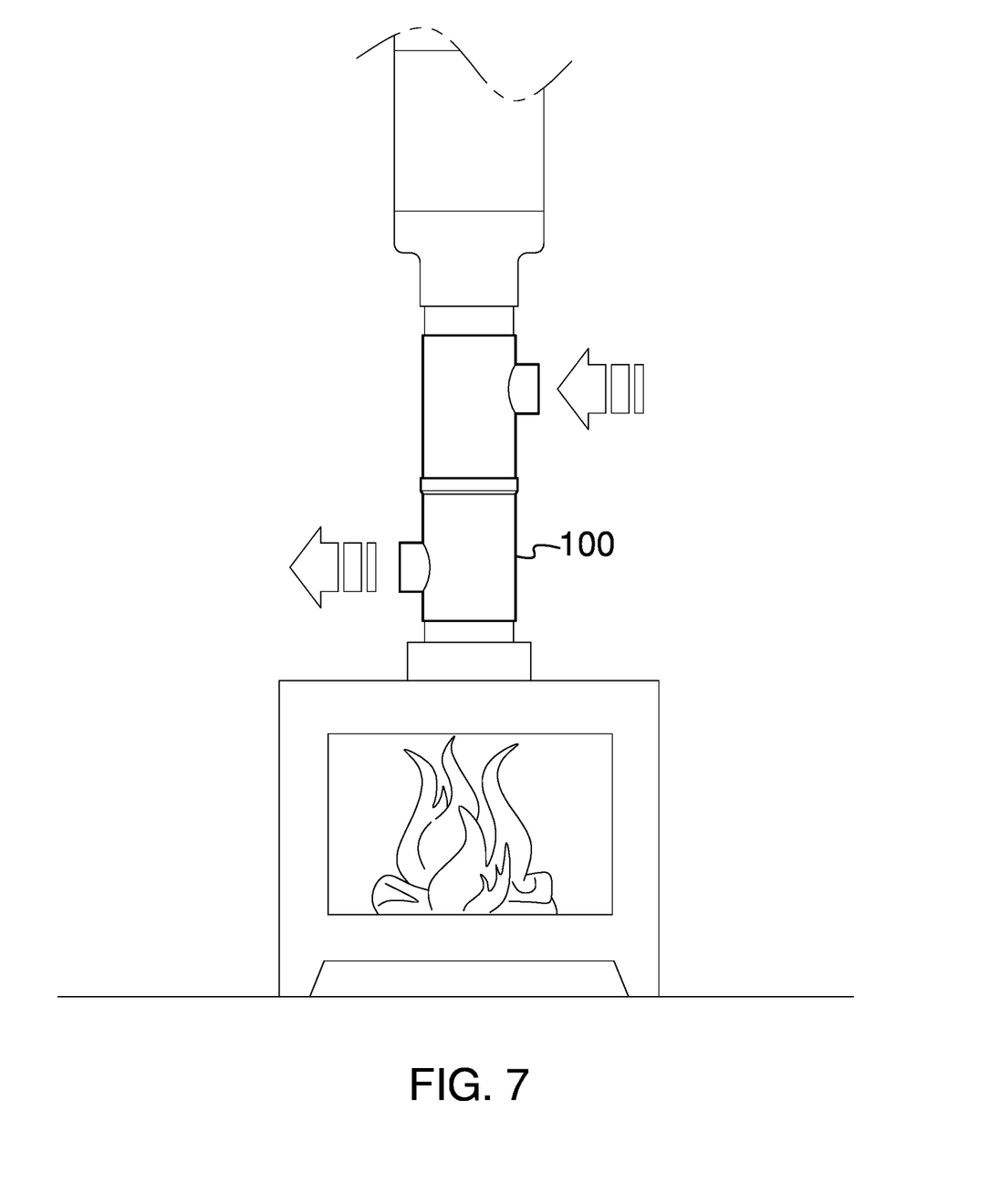
FIG. 7 is an in-use view of an embodiment of the disclosure.

Detailed reference will now be made to one or more potential embodiments of the disclosure, which are illustrated in FIGS. 1 through 7.

The heat recovery system 100 (hereinafter invention) is a heat transfer device. The invention 100 is configured for use with an HVAC. The invention 100 captures waste heat that is generated by an exothermic chemical reaction (such as combustion). The invention 100 transports the captured waste heat to an HVAC. The captured waste heat is used to increase the temperature of air that is drawn into the invention 100 from the environment. The heated air is discharged into the HVAC. The invention 100 comprises a radiator structure 101, an exterior shell 102, and a fan structure 103. The radiator structure 101 is contained in the exterior shell 102. The fan structure 103 mounts on the exterior shell 102. The invention 100: a) draws air in from the environment; b) heats the drawn air over the radiator structure 101; and, c) discharges the heated drawn air into the HVAC.

The exterior shell 102 is a prism shaped structure. The exterior shell 102 is a rigid structure. The exterior shell 102 is a hollow structure. The exterior shell 102 has a tubular shape. The radiator structure 101 mounts into the hollow interior of the exterior shell 102. The exterior shell 102 comprises an exhaust lateral face structure 121, an intake plate mount 122, and an exhaust plate mount 123.

The exhaust lateral face structure 121 forms the lateral face of the prism structure of the exterior shell 102. The exhaust lateral face structure 121 forms the boundary surface of the containment space formed by the exterior shell 102. The exhaust lateral face structure 121 is formed from a fluid impermeable material. The exhaust lateral face structure 121 forms a protection space that ensures that neither the waste heat nor the liquid phase material leaks uncontrollably from the exterior shell 102 into the environment.

The exhaust lateral face structure 121 comprises an intake port structure 141 and an exhaust port structure 142. The intake port structure 141 is a port that is formed in the exhaust lateral face structure 121 of the exterior shell 102. The fan structure 103 mounts in the intake port structure 141. The intake port structure 141 forms the fluid flow pathway that allows the fan structure 103 to draw air from the environment into the exterior shell 102. The exhaust port structure 142 is a port that is formed in the exhaust lateral face structure 121 of the exterior shell 102. The exhaust port structure 142 forms the fluid flow pathway that allows the fan structure 103 to discharge air from the exterior shell 102.

The intake plate mount 122 is formed on an open congruent end of the tubular structure of the exterior shell 102. The intake plate mount 122 forms a mount that attaches the intake foraminous plate 111 to the exterior shell 102.

The exhaust plate mount 123 is formed on an open congruent end of the tubular structure of the exterior shell 102. The exhaust plate mount 123 forms a mount that attaches the discharge foraminous plate 112 to the exterior shell 102.

The radiator structure 101 is a mechanical device. The radiator structure 101 is a heat transfer device. The radiator structure 101 forms a fluid transport structure. The radiator structure 101 transports a liquid phase material through the exterior shell 102. The liquid phase material transports the waste heat generated by the exothermic reaction. The radiator structure 101 forms a conductive structure that transfers the transported waste heat to an air flow generated by the fan structure 103. The radiator structure 101 comprises a plurality of exhaust tubes 113, an intake foraminous plate 111, and a discharge foraminous plate 112.

The plurality of exhaust tubes 113 comprises a collection of individual exhaust tubes 131. The plurality of exhaust tubes 113 forms a fluid transport structure. The plurality of exhaust tubes 113 is a fluid impermeable structure. The plurality of exhaust tubes 113 transports the liquid phase material through the exterior shell 102. The plurality of exhaust tubes 113 is formed from a heat conductive material. The plurality of exhaust tubes 113 transfers the waste heat carried by the liquid phase material to the air flowing through the exterior shell 102.

Each individual exhaust tube 131 selected from the plurality of exhaust tubes 113 is a prism shaped structure. Each selected individual exhaust tube 131 is a rigid structure. Each selected individual exhaust tube 131 is a hollow structure. Each selected individual exhaust tube 131 has a tubular shape. Each selected individual exhaust tube 131 is a fluid impermeable structure. Each selected individual exhaust tube 131 forms a fluid transport structure that transports a portion of the liquid phase material through the radiator structure 101. Each selected individual exhaust tube 131 is formed from a heat conductive material. Each selected individual exhaust tube 131 transfers the waste heat carried by the liquid phase material into the air flowing around the selected individual exhaust tube 131. Each selected individual exhaust tube 131 forms a fluidic connection with the intake foraminous plate 111. Each selected individual exhaust tube 131 forms a fluidic connection with the discharge foraminous plate 112.

Each individual exhaust tube 131 selected from the plurality of exhaust tubes 113 further comprises an intake congruent end 132, a discharge congruent end 133, and a lateral face structure 134.

The lateral face structure 134 forms the lateral face of the prism structure of the selected individual exhaust tube 131. The lateral face structure 134 forms a fluid impermeable structure that contains the liquid phase material flowing through the selected individual exhaust tube 131. The lateral face structure 134 forms the structure that guides the path of the flow of the liquid phase material through the selected individual exhaust tube 131.

The intake congruent end 132 is an open congruent end of the tubular structure of the selected individual exhaust tube 131. The intake congruent end 132 is the end of the intake foraminous plate 111 of the radiator structure 101 that receives the liquid phase material. The intake congruent end 132 inserts into an aperture of the foraminous structure of the intake foraminous plate 111. The intake congruent end 132 forms a fluid impermeable seal with the intake foraminous plate 111.

The discharge congruent end 133 is an open congruent end of the tubular structure of the selected individual exhaust tube 131. The discharge congruent end 133 is the end of the discharge foraminous plate 112 of the radiator structure 101 that discharges the liquid phase material. The discharge congruent end 133 inserts into an aperture of the foraminous structure of the discharge foraminous plate 112. The discharge congruent end 133 forms a fluid impermeable seal with the discharge foraminous plate 112.

The intake foraminous plate 111 is a rigid structure. The intake foraminous plate 111 is a disk shaped structure. The intake foraminous plate 111 has a foraminous structure. The intake foraminous plate 111 secures the plurality of exhaust tubes 113 into a fixed position within the hollow interior of the exterior shell 102. The intake foraminous plate 111 attaches to the intake plate mount 122 of the exterior shell 102. Each individual exhaust tube 131 selected from the plurality of exhaust tubes 113 inserts into an aperture that forms the foraminous structure of the intake foraminous plate 111.

The discharge foraminous plate 112 is a rigid structure. The discharge foraminous plate 112 is a disk shaped structure. The discharge foraminous plate 112 has a foraminous structure. The discharge foraminous plate 112 secures the plurality of exhaust tubes 113 into a fixed position within the hollow interior of the exterior shell 102. The discharge foraminous plate 112 attaches to the exhaust plate mount 123 of the exterior shell 102. Each individual exhaust tube 131 selected from the plurality of exhaust tubes 113 inserts into an aperture that forms the foraminous structure of the discharge foraminous plate 112.

The fan structure 103 is a mechanical device. The fan structure 103 converts an externally provided source of energy into an air flow. The fan structure 103 is a fan. The fan structure 103 pumps the air flow through the exterior shell 102. The fan structure 103 pumps the air flow around the plurality of exhaust tubes 113 such that the heat transported by the plurality of exhaust tubes 113 transfers into the air flow. The fan structure 103 pumps the air flow with adequate forces such that the heated air flow is discharged from the exterior shell 102 through the exhaust port structure 142. The fan structure 103 mounts on the intake port structure 141 of the exhaust lateral face structure 121. The fan structure 103 draws air from the environment into the exterior shell 102 through the intake port structure 141. The fan structure 103 discharges the heated air flow from the fan structure 103 through the exhaust port structure 142.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Aperture: As used in this disclosure, an aperture is a prism-shaped negative space that is formed completely through a structure or the surface of a hollow structure.

Barrier: As used in this disclosure, a barrier is a physical obstacle that forms a boundary between a first space and a second space. The barrier prevents the passage of an object between the first space and the second space.

Boundary Structure: As used in this disclosure, a boundary structure is a barrier that separates a first object from a second object such that the second object cannot damage the first object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Energy: As used in this disclosure, the energy is a term used in physics. Energy refers to the ability of a system to do work. Energy is a conserved property of a system. Energy is a quantifiable and is generally expressed in units of Joules.

Environment: As used in this disclosure, an environment refers to the physical conditions surrounding an object. The term environment is often limited to the physical conditions that the object interacts with.

Exothermic: As used in this disclosure, the term exothermic refers to a chemical reaction that releases heat as a result of the reaction.

Exterior: As used in this disclosure, the exterior is used as a relational term that implies that an object is not contained within the boundary of a structure or a space.

Fan: As used in this disclosure, a fan is a pump that moves a gas.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Foraminous: As used in this disclosure, foraminous is an adjective that describes a surface, plate, disk, or platform that is perforated with a plurality of apertures.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Heat: As used in this disclosure, heat refers to a transfer of energy between a first object and a second object such that the temperatures of the first object and the second object of one or both of the objects changes. In common usage, heat is said to flow from the warmer object to the cooler object. In systems where the combined energies of the first object and the second object remain constant, the equilibrium temperatures of the first object and the second object will be equal. The verb to heat is taken to mean the act of adding energy to the first object such that the temperature of the first object increases relative to a second object.

Heat Transfer: As used in this disclosure, heat transfer refers an exchange of thermal energy between a first object and a second object. In thermodynamics the first and second objects are often referred to as systems. This disclosure assumes that heat transfer occurs through three mechanisms: conduction, convection, and radiation. By conduction is meant that the heat is exchanged through the contact between the first object and the second object which facilitates the direct transfer of the energy of the vibration of the molecules of the first object to the molecules of the second object. By convection is meant that the heat is transferred through the exchange or movement of mass within and between the first object and the second object. By radiation is meant the transfer of heat energy in the form of (typically electromagnetic) waves between the first object and the second object.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Protection Space: As used in this disclosure, a protection space is a space formed by a boundary structure. The boundary structure forms a protective barrier that protects objects outside the protection space from potential dangers from the operation of a device or process contained within the protection space.

Protective Barrier: As used in this disclosure, a protected barrier is a boundary structure. The boundary structure forms a barrier that separates a first object from a second object such that the second object cannot damage the first object.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Radiator and Heat Sink: As used in this disclosure, the radiator and the heat sink are heat exchange devices used to transfer energy in the form of heat from a first system (or object) into a second system (or object). Typically, the term radiator is used to describe a situation where the heat exchange device releases heat energy into the second system while the term heat sink is used to describe a situation where the heat exchange device extracts heat energy from the first system. It is not unusual to informally use the terms radiator and heat sink interchangeably.

Reduction-Oxidation Reaction: As used in this disclosure, a reduction-oxidation reaction (also known as a redox reaction) is a chemical reaction involving the transfer of electrons between the reactants of the reaction.

Temperature: As used in this disclosure, temperature refers to a relative measure of the kinetic and vibrational energy contained in the atoms and molecules of a first object (or system) relative to the kinetic and vibrational energy contained in the atoms and molecules of a second object (or system). When two objects (or systems) are in thermal equilibrium, the temperature of the two objects (or systems) is the same.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Solid: As used in this disclosure, a solid refers to a state (phase) of matter that: 1) has a fixed volume; and, 2) does not flow.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A heat recovery system comprising
wherein the heat recovery system comprises a radiator structure, an exterior shell, and a fan structure;
wherein the radiator structure is contained in the exterior shell;
wherein the fan structure mounts on the exterior shell;
wherein the captured waste heat is used to increase the temperature of air that is drawn into the heat recovery system from the environment;
wherein the fan structure converts an externally provided source of energy into an air flow;
wherein the fan structure pumps the air flow through the exterior shell;
wherein the fan structure pumps the air flow around a plurality of exhaust tubes such that the heat transported by the plurality of exhaust tubes transfers into the air flow;
wherein the fan structure pumps the air flow with adequate forces such that the heated air flow is discharged from the exterior shell through the exhaust port structure;
wherein the fan structure mounts on an intake port structure of an exhaust lateral face structure;
wherein the fan structure draws air from the environment into the exterior shell through the intake port structure;
wherein the fan structure discharges the heated air flow from the fan structure through the exhaust port structure;
wherein the exhaust lateral face structure comprises an intake port structure and an exhaust port structure;
wherein the intake port structure is a port that is formed in the exhaust lateral face structure of the exterior shell;
wherein the fan structure mounts in the intake port structure;
wherein the intake port structure forms the fluid flow pathway that allows the fan structure to draw air from the environment into the exterior shell;
wherein the exhaust port structure is a port that is formed in the exhaust lateral face structure of the exterior shell;
wherein the exhaust port structure forms the fluid flow pathway that allows the fan structure to discharge air from the exterior shell.

2. The heat recovery system according to claim 1
wherein the heat recovery system is a heat transfer device;
wherein the heat recovery system captures waste heat.

3. The heat recovery system according to claim 2
wherein the exterior shell is a rigid structure;
wherein the exterior shell is a hollow structure;
wherein the exterior shell has a tubular shape;
wherein the radiator structure mounts into the hollow interior of the exterior shell.

4. The heat recovery system according to claim 3
wherein the radiator structure is a mechanical device;
wherein the radiator structure is a heat transfer device;
wherein the radiator structure forms a fluid transport structure;
wherein the radiator structure transports a liquid phase material through the exterior shell;
wherein the liquid phase material transports the waste heat generated by the exothermic reaction;
wherein the radiator structure forms a conductive structure that transfers the transported waste heat to an air flow generated by the fan structure.

5. The heat recovery system according to claim 4
wherein the exterior shell comprises an exhaust lateral face structure, an intake plate mount, and an exhaust plate mount;
wherein the exhaust lateral face structure forms the lateral face of the exterior shell;
wherein the exhaust lateral face structure forms the boundary surface of the containment space formed by the exterior shell;
wherein the exhaust lateral face structure is formed from a fluid impermeable material;
wherein the exhaust lateral face structure forms a protection space that ensures that neither the waste heat nor the liquid phase material leaks uncontrollably from the exterior shell into the environment;

wherein the intake plate mount is formed on an open congruent end of the tubular structure of the exterior shell;

wherein the intake plate mount forms a mount that attaches the intake foraminous plate to the exterior shell;

wherein the exhaust plate mount is formed on an open congruent end of the tubular structure of the exterior shell;

wherein the exhaust plate mount forms a mount that attaches the discharge foraminous plate to the exterior shell.

6. The heat recovery system according to claim 5 wherein the radiator structure comprises a plurality of exhaust tubes, an intake foraminous plate, and a discharge foraminous plate;

wherein the intake foraminous plate attaches to the plurality of exhaust tubes;

wherein the discharge foraminous plate attaches to the plurality of exhaust tubes.

7. The heat recovery system according to claim 6 wherein the plurality of exhaust tubes comprises a collection of individual exhaust tubes;

wherein the plurality of exhaust tubes forms a fluid transport structure;

wherein the plurality of exhaust tubes is a fluid impermeable structure;

wherein the plurality of exhaust tubes transports the liquid phase material through the exterior shell;

wherein the plurality of exhaust tubes is formed from a heat conductive material;

wherein the plurality of exhaust tubes transfers the waste heat carried by the liquid phase material to the air flowing through the exterior shell.

8. The heat recovery system according to claim 7 wherein the intake foraminous plate is a rigid structure;

wherein the intake foraminous plate is a disk shaped structure;

wherein the intake foraminous plate has a foraminous structure;

wherein the intake foraminous plate secures the plurality of exhaust tubes into a fixed position within the hollow interior of the exterior shell;

wherein the intake foraminous plate attaches to the intake plate mount of the exterior shell;

wherein each individual exhaust tube selected from the plurality of exhaust tubes inserts into an aperture that forms the foraminous structure of the intake foraminous plate;

wherein the discharge foraminous plate is a rigid structure;

wherein the discharge foraminous plate is a disk shaped structure;

wherein the discharge foraminous plate has a foraminous structure;

wherein the discharge foraminous plate secures the plurality of exhaust tubes into a fixed position within the hollow interior of the exterior shell;

wherein the discharge foraminous plate attaches to the exhaust plate mount of the exterior shell;

wherein each individual exhaust tube selected from the plurality of exhaust tubes inserts into an aperture that forms the foraminous structure of the discharge foraminous plate.

9. The heat recovery system according to claim 8 wherein each selected individual exhaust tube is a rigid structure;

wherein each selected individual exhaust tube is a hollow structure;

wherein each selected individual exhaust tube has a tubular shape;

wherein each selected individual exhaust tube is a fluid impermeable structure;

wherein each selected individual exhaust tube forms a fluid transport structure that transports a portion of the liquid phase material through the radiator structure;

wherein each selected individual exhaust tube is formed from a heat conductive material;

wherein each selected individual exhaust tube transfers the waste heat carried by the liquid phase material into the air flowing around the selected individual exhaust tube;

wherein each selected individual exhaust tube forms a fluidic connection with the intake foraminous plate;

wherein each selected individual exhaust tube forms a fluidic connection with the discharge foraminous plate.

10. The heat recovery system according to claim 9 wherein each individual exhaust tube selected from the plurality of exhaust tubes further comprises an intake congruent end, a discharge congruent end, and a lateral face structure;

wherein the lateral face structure forms the lateral face of the selected individual exhaust tube;

wherein the lateral face structure forms a fluid impermeable structure that contains the liquid phase material flowing through the selected individual exhaust tube;

wherein the lateral face structure forms the structure that guides the path of the flow of the liquid phase material through the selected individual exhaust tube;

wherein the intake congruent end is an open congruent end of the tubular structure of the selected individual exhaust tube;

wherein the intake congruent end is the end of the intake foraminous plate of the radiator structure that receives the liquid phase material;

wherein the intake congruent end inserts into an aperture of the foraminous structure of the intake foraminous plate;

wherein the intake congruent end forms a fluid impermeable seal with the intake foraminous plate;

wherein the discharge congruent end is an open congruent end of the tubular structure of the selected individual exhaust tube;

wherein the discharge congruent end is the end of the discharge foraminous plate of the radiator structure that discharges the liquid phase material;

wherein the discharge congruent end inserts into an aperture of the foraminous structure of the discharge foraminous plate;

wherein the discharge congruent end forms a fluid impermeable seal with the discharge foraminous plate.

* * * * *